United States Patent [19]

Grosch

[11] Patent Number: 4,838,006
[45] Date of Patent: Jun. 13, 1989

[54] SPACER FOR PANES OF MULTIPLE-PANE WINDOWS

[75] Inventor: Karl Grosch, Wuppertal, Fed. Rep. of Germany

[73] Assignee: Julius & August Erbslöh GmbH & Co., Velbert, Fed. Rep. of Germany

[21] Appl. No.: 87,577

[22] Filed: Aug. 20, 1987

[30] Foreign Application Priority Data

Aug. 20, 1986 [DE] Fed. Rep. of Germany ....... 3628275

[51] Int. Cl.[4] .............................................. E04C 2/54
[52] U.S. Cl. ....................................... 52/790; 52/172; 428/34
[58] Field of Search ................. 52/172, 788, 789, 790; 428/34

[56] References Cited

U.S. PATENT DOCUMENTS

| | | | |
|---|---|---|---|
| 1,728,984 | 9/1929 | Starr | 52/172 |
| 1,913,702 | 6/1933 | D'Adrian | 52/172 |
| 3,570,201 | 3/1971 | Barroero | 52/172 |
| 3,994,109 | 11/1976 | Pandell | 428/34 |

FOREIGN PATENT DOCUMENTS

| | | | |
|---|---|---|---|
| 564321 | 10/1958 | Canada | 52/790 |
| 90916 | 10/1983 | European Pat. Off. | 52/172 |
| 965661 | 6/1957 | Fed. Rep. of Germany | 52/788 |
| 559428 | 3/1957 | Italy | 52/172 |
| 141651 | 7/1985 | Japan | 428/34 |
| 998396 | 2/1983 | U.S.S.R. | 52/790 |
| 2144167 | 2/1985 | United Kingdom | 52/788 |

Primary Examiner—Henry E. Raduazo
Attorney, Agent, or Firm—Peter K. Kontler

[57] ABSTRACT

A spacer for use between curved panes of a multiple-pane window in the door or in another part of a motor vehicle has an inverted U-shaped solid section and a straight hollow section with an internal space for a supply of desiccant and with one or more openings establishing communication between such space and the compartment which is surrounded by the frame and is flanked by the panes. The end portions of the solid section have studs which are sealingly received in sockets provided in the corresponding end portions of the hollow section. Portions of the solid section are bent to conform to the curvature of the panes. The cross-sectional outline of the hollow section can match that of the solid section.

10 Claims, 1 Drawing Sheet

SPACER FOR PANES OF MULTIPLE-PANE WINDOWS

BACKGROUND OF THE INVENTION

The invention relates to multiple-pane windows in general, and more particularly to improvements in spacers which are used between the panes of such windows. Still more particularly, the invention relates to improvements in spacers of the type wherein the frame of the spacer contains a supply of desiccant and has one or more openings establishing communication between the space for desiccant and the compartment which is surrounded by the frame and is flanked by the panes of the window when the spacer is properly installed between the panes.

Conventional multiple-pane insulating and/or soundproofing windows include pairs of flat panes with a polygonal spacer frame between the marginal portions of the panes. As a rule, the frame is made of hollow metallic stock, such as aluminum or an aluminum alloy, and contains a supply of desiccant which prevents accumulation of moisture in the compartment between the panes and hence a fogging of the window. Moreover, it is very difficult to adequately anodize hollow spacers, especially if the dimensions of such spacers are rather small, because remnants of electrolyte cannot be evacuated from the interior of a small spacer so that they can cause premature corrosion of the frame.

Spacers which are not entirely flat are necessary in the windows of motor vehicles, i.e., in windows wherein the spacer must be inserted between two panes which are not flat but can exhibit a pronounced curvature.

OBJECTS AND SUMMARY OF THE INVENTION

An object of the invention is to provide a novel and improved spacer for use in multiple-pane insulating and/or soundproofing windows which is constructed and assembled in such a way that it can readily fit between curved panes.

Another object of the invention is to provide a spacer which can prevent fogging of the panes even though the twisted or bent parts of its frame do not or need not contain any desiccant.

A further object of the invention is to provide a novel composite spacer for use in multiple-pane windows of motor vehicles and the like.

An additional object of the invention is to provide a spacer which can be assembled of relatively simple and inexpensive parts and requires a relatively small quantity of desiccant.

A further object of the invention is to provide a novel and improved method of sealing the space between two curved panes which form part of a multiple-pane window for use in motor vehicles.

Still another object of the invention is to provide a novel and improved method of making a composite spacer for use between arcuate panes.

The improved spacer comprises a frame including a solid first elongated section (e.g., a substantially U-shaped section) and a hollow elongated (e.g., straight) second section. The second section defines an internal space for a supply of pulverulent desiccant and has at least one opening which establishes communication between the internal space and the surrounding atmosphere, namely with the chamber or compartment which is surrounded by the frame and is flanked by two panes when the frame is properly installed in a multiple-pane window. The second section is preferably adjacent the underside of the frame if the latter is used between two panes in a window of a motor vehicle so that the hollow section can be confined in the door frame or in another part of the body of the vehicle.

The spacer further comprises means for coupling the sections to each other, e.g., end-to-end. The coupling means can comprise male coupling elements on one of the sections (e.g., in the form of studs at the ends of the first section) and complementary female coupling elements (e.g., in the form of sockets) in the other section.

The sections may but need not have at least substantially identical (circular, oval or polygonal) cross-sectional outlines. Alternatively, the cross-sectional area of the second section can exceed that of the first section so that the second section can confine a larger quantity of desiccant. To this end, the height of the second section (in the general plane of the frame) can exceed the height of the first section.

The first section of the frame can include one or more arcuate portions, especially if the frame is used between two arcuate panes. This renders it possible to use a straight second section.

The novel features which are considered as characteristic of the invention are set forth in particular in the appended claims. The improved spacer itself, however, both as to its construction and the mode of installing the same, together with additional features and advantages thereof, will be best understood upon perusal of the following detailed description of certain specific embodiments with reference to the accompanying drawing.

BRIEF DESCRIPTION OF THE DRAWING

FIG. 1 is a schematic elevational view of a multiple-pane window employing a spacer which embodies one form of the invention;

FIG. 2 is an enlarged sectional view substantially as seen in the direction of arrows from the line II—II of FIG. 1;

FIG. 3 is an enlarged sectional view as seen in the direction of arrows from the line III—III in FIG. 1;

FIG. 4 is a sectional view similar to that of FIG. 2 but showing a portion of a multiple-pane window with a modified spacer; and FIG. 5 is a sectional view similar to that of FIG. 3 but showing the coupling between one end of the solid section and the adjacent end of the hollow section in the frame of the spacer which is shown in FIG. 4.

DESCRIPTION OF THE PREFERRED EMBODIMENTS

Figure 1A:
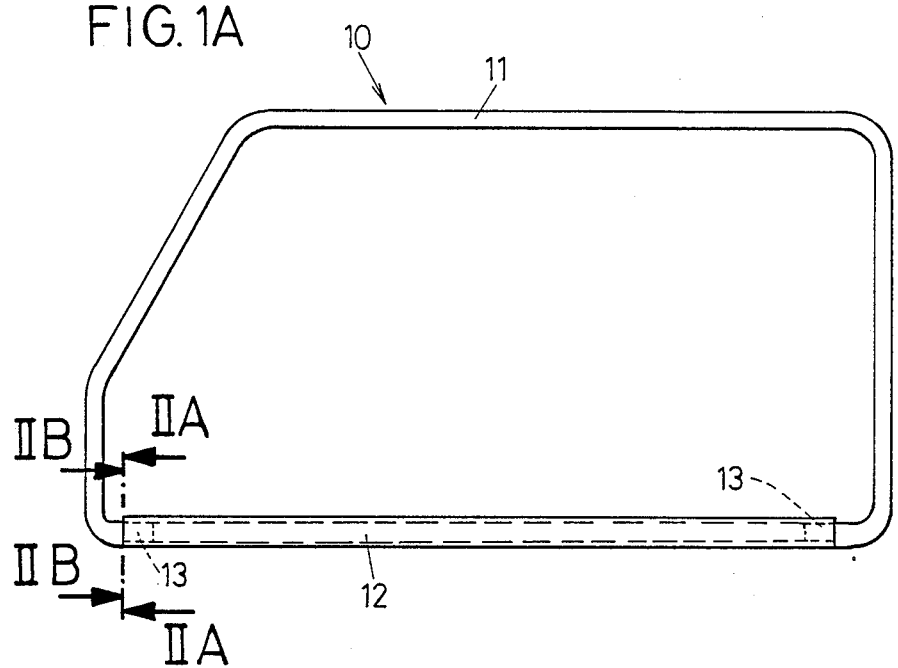
FIG. 1A is a similar view of a modified window.

FIG. 1 shows a spacer which includes a frame 10 having a substantially U-shaped solid upper section 11 and a hollow straight lower section 12. The end portions of the solid section 11 are provided with male coupling elements in the form of studs 13 (see particularly FIG. 3) fitting into complementary female coupling elements or sockets at the respective ends of the section 12. The latter has an elongated internal space (FIG. 2) for a supply 14 of pulverulent desiccant. The top wall of the section 12 has a series of spaced-apart openings 20 which establish communication between the internal space of the section 12 and the compartment or chamber 19 between the arcuate panes 15, 16 of a multiple-pane window employing the spacer frame 10 of FIG. 1. The solid section 11 of the frame 10 has one or more curved portions (see FIG. 2) whose curvature conforms to that of the panes 15 and 16. The reference characters 17 and 18 denote a sealing compound which is used to sealingly bond the lateral surfaces of the sections 11, 12 to the adjacent marginal portions of the inner sides of the panes 15, 16 so as to reduce the likelihood of penetration of moisture into the compartment 19. Such sealing compound (or another suitable adhesive) can also be used to coat the studs 13 and the adjacent end faces of the sections 11, 12 in order to adequately seal the joints between the sections. The sockets for the studs 13 of the section 11 can constitute the respective ends of the space for the supply 14 of desiccant. Instead of using an adhesive, it is also possible to secure the studs 13 in the end portions of the section 12 by transversely extending pins or the like. The openings 18 can be replaced with one or more slots, i.e., with numerous coherent openings, without departing from the spirit of the invention.

Figures 2A, 2B:
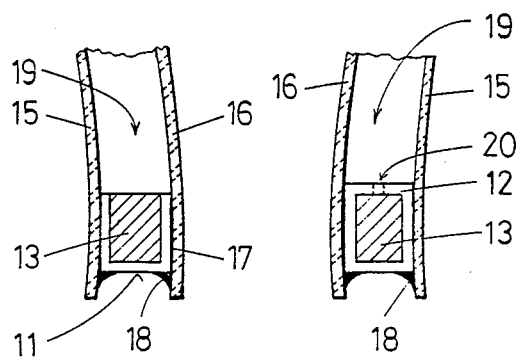
FIG. 2A is an enlarged sectional view as seen in the direction of arrows from the line IIA—IIA of FIG. 1A.
FIG. 2B is an enlarged sectional view as seen in the direction of arrows from the line IIB—IIB of FIG. 1A.

The cross-sectional outline of the section 12 is a square or a rectangle and preferably matches that of the section 11. However, it is possible to increase at least one dimension of the section 12 beyond that of the corresponding dimension of the section 13, e.g., in order to provide a larger space for the supply 14 of desiccant. For example, the height of the cross-section of the section 12 (as seen in FIGS. 1A, 2 and 2B, i.e., in the general plane of the frame 10) can exceed the height of the section 11 (FIG. 2A) so as to increase the corresponding dimension of the space for the desiccant.

An advantage of the improved spacer is that the hollow section 12 need not be bent in order to impart to the frame 10 a configuration which is required between two concavo-convex panes 15, 16, e.g., in the window which is installed in a door of a motor vehicle. This contributes to simplicity of the frame 10 and to lower cost of the spacer. Bending of selected portions of the solid section 11 presents no problems. On the other hand, pronounced bending of the hollow section 12 could result in sealing of one or more openings 20 which would affect the ability of desiccant to gather moisture from the compartment 19.

Another important advantage of the improved spacer is that the solid section 11 can be anodized in a simple way and without risking retention of substantial quantities of electrolyte which could corrode the material of the frame. Anodizing is desirable because it provides the surfaces of the section with a protective oxide layer. Anodizing of the hollow section 12 is not absolutely necessary since this section is permanently confined in the door frame or in another part of the vehicle when the multiple-pane window using the spacer or FIGS. 1 to 3 is installed in a motor vehicle.

It has been found that a straight hollow section 12 which extends along the underside of the frame 10 can provide ample room or space for a requisite supply of desiccant. The volume of the compartment 19 between the panes 15, 16 in the window of a motor vehicle is not too large (at least in most instances) so that the supply 14 of desiccant in the hollow section 12 is sufficient in all or practically all instances. Moreover, and as mentioned above, the height of the section 12 in the general plane of the window can be increased to thus enlarge the space for the desiccant. This does not detract from the appearance of the window since the section 12 is normally or invariably concealed if it is adjacent the underside of the frame 10 and the latter is used in the multiple-pane window of a motor vehicle.

FIGS. 4 and 5 show a portion of a modified multiple-pane window wherein the panes 15, 16 are curved in the same way as shown in FIG. 2 and flank a frame having a solid section 11' with a circular cross-sectional outline and a hollow section 12' having a similar or identical circular cross-sectional outline. The section 12' can constitute a length of tubing made of aluminum or an aluminum alloy. The ends of the section 11 are provided with smaller-diameter studs 13' (FIG. 5) fitting into complementary sockets of the section 12', e.g., directly into the end portions of the space for the supply 14 of desiccant in the section 12'. The section 11' can be made of a length of solid cylindrical metallic bar stock with portions suitably bent so as to conform to the curvature of the panes 15 and 16. These panes are bonded to the sections 11' and 12' by layers of sealing compound shown at 17 and 18.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A spacer for arcuate panes of a multiple-pane window, comprising a self-supporting frame including a solid first elongated section and a hollow second elongated section defining an internal space for a supply of desiccant and having at least one opening which establishes communication between said space and the surrounding atmosphere, said first section having at least one arcuate portion and the cross-sectional area of said second section exceeding the cross-sectional area of said first section.

2. The spacer of claim 1, wherein said frame has a plurality of sides and said second section is adjacent one of said sides.

3. The spacer of claim 1, wherein said frame has an underside and said second section is adjacent said underside.

4. The spacer of claim 1, further comprising means for coupling said sections to each other.

5. The spacer of claim 4, wherein said coupling means comprises male coupling elements on one of said sections and complementary female coupling elements on the other of said sections.

6. The spacer of claim 5, wherein said male coupling elements include studs on said first section.

7. The spacer of claim 8, wherein said sections are substantially coplanar and the height of said second section in the plane of said sections exceeds the height of said first section.

8. The spacer of claim 1, wherein said second section is straight.

9. The spacer of claim 1, wherein each of said sections has a polygonal cross-sectional outline.

10. The spacer of claim 1, wherein each of said sections has a substantially circular cross-sectional outline.

* * * * *